United States Patent
Jiang

(10) Patent No.: US 8,274,906 B2
(45) Date of Patent: Sep. 25, 2012

(54) TRANSIENT ANALYSIS OF PACKET QUEUING LOSS IN A BROADCAST NETWORK

(75) Inventor: Wenyu Jiang, San Francisco, CA (US)

(73) Assignee: Dolby Laboratories Licensing Corporation, San Francisco (*) Notice: Subject to any disclaimer, the term of this patent is extended or adjusted under 35 U.S.C. 154(b) by 386 days.

(21) Appl. No.: 12/310,181

(22) PCT Filed: Aug. 16, 2007

(86) PCT No.: PCT/US2007/018210
§ 371 (c)(1),
(2), (4) Date: Feb. 13, 2009

(87) PCT Pub. No.: WO2008/021470
PCT Pub. Date: Feb. 21, 2008

(65) Prior Publication Data
US 2009/0252050 A1    Oct. 8, 2009

Related U.S. Application Data

(60) Provisional application No. 60/838,588, filed on Aug. 17, 2006.

(51) Int. Cl.
*H04L 12/26* (2006.01)
(52) U.S. Cl. ........................................ 370/252
(58) Field of Classification Search .................. 370/252, 370/253, 254
See application file for complete search history.

(56) References Cited

U.S. PATENT DOCUMENTS

| | | | |
|---|---|---|---|
| 6,385,672 B1* | 5/2002 | Wang et al. ..................... | 710/56 |
| 6,421,387 B1* | 7/2002 | Rhee .......................... | 375/240.27 |
| 6,452,950 B1* | 9/2002 | Ohlsson et al. ............... | 370/516 |
| 7,447,977 B2* | 11/2008 | Bauer et al. ................... | 714/774 |
| 2003/0110513 A1* | 6/2003 | Plourde et al. ................ | 725/134 |
| 2008/0095124 A1* | 4/2008 | Ramos et al. ................. | 370/336 |

FOREIGN PATENT DOCUMENTS
WO    WO 2007/005160    1/2007

OTHER PUBLICATIONS

Rubenstein, Dan, et al, "Real-Time Reliable Multicast Using Proactive Forward Error Correction", IEEE NOSSDAV '98, Cambridge, UK Jul. 1998, pp. 1-15; UMass CMPSCI Tech Report 98-19.
Bauer et al., Optimal choice of FEC parameters to protect against queueing losses in wireless networks, IEEE Int. Conf. on Networks, Nov. 2005. Bauer et al., "Optimal parameter settings for forward error correction schemes for multimedia streaming over wireless networks," IEEE Workshop on Multimedia Sig. Proc., Oct. 2005, Shanghai, China, 2005.
Gurewitz et al., "The Ballot Theorem Strikes Again: Packet Loss Process Distribution," IEEE Trans. on Info. Theory, Piscataway, NJ, vol. 46, No. 7, Nov. 2000.
McAuley, "Reliable Broadband Communication Using a Burst Erasure Correcting Code," ACM SigComm '90, Philadelphia, 1990.

* cited by examiner

*Primary Examiner* — Anh-Vu Ly
*Assistant Examiner* — Mohammad Anwar

(57) ABSTRACT

A receiver monitoring the transmissions of a packet processing device such as a wireless access point analyzes the monitored transmissions to estimate the probability of packet loss due to buffer overflow in the processing device. The loss probability can be estimated for individual packets to follow rapid changes in communication conditions. An indication of the estimated loss probability can be used to adapt the forward error correction (FEC) parameters that are used to generate the packets, thereby improving the reliability of data delivery to a receiver while optimizing the use of communication channel bandwidth.

24 Claims, 2 Drawing Sheets

TRANSIENT ANALYSIS OF PACKET QUEUING LOSS IN A BROADCAST NETWORK

TECHNICAL FIELD

The present invention pertains to optimizing the operation of devices that process streams of data arranged in packets for transmission to receivers, and is directed more particularly to adapting the operation of the devices in networks to minimize packet losses at a receiver. For example, the present invention may be used advantageously in systems that transmit streams of packets carrying multimedia data over wireless networks.

BACKGROUND ART

The delivery of real-time multimedia traffic over wireless networks is expected to be an important application in Third Generation Cellular, WIFI and WIMAX wireless networks. In these applications, multimedia data such as digital data representing images and sounds are organized into packets. Multimedia sources send streams of these packets to processing devices such as wireless access points that transmit the packets over wireless communication channels to end-user receivers. If a processing device is unable to transmit a packet immediately, it temporarily stores the packet in a queue or buffer until it can be transmitted. For example, a processing device may not be able to transmit a packet when the wireless communication channel is being used by another processing device.

The perceived quality of the multimedia data as received by the end user can be adversely affected by a number of factors including packet loss. Packet loss includes missing packets, which are not received by the end-user receiver, and corrupted packets, which are received but the data they carry has been corrupted. These packet losses may be caused by: (1) noisy communication channels, (2) simultaneous transmissions or "collisions" with packets sent by multiple transmitters, and (3) overflow of the buffers used in the processing devices to temporarily store packets before they are transmitted. Buffer overflow can occur when a processing device must temporarily store a packet in its buffer but the buffer is already full.

A number of techniques have been proposed to reduce the perceived effects of packet losses. One technique known as Forward Error Correction (FEC) enables a receiver to recover the data carried by missing or corrupted packets provided the conditions that caused the losses are not too frequent and do not last too long. The length and frequency of the error-causing conditions that can be handled by FEC are controlled by two parameters n and k, where a number (n−k) of "FEC packets" are combined with a number k of multimedia packets to form a set of packets with a total number of n multimedia and FEC packets. If a receiver can receive at least k of the n packets without corruption, then any losses due to missing and corrupted packets can be corrected. If fewer than k packets out of the n packets are received without corruption, then lost data for one or more packets cannot be recovered by FEC.

Unfortunately, FEC has a cost. The additional number (n−k) of FEC packets increases the risk of delays due to collisions and increases either the time or the channel bandwidth needed to transmit each set of packets. The values of the FEC parameters (n,k) may be chosen to optimize a tradeoff between competing requirements. A higher ratio $\phi=n/k$ increases the level of error correction that is possible but also increases delays and increases the needed channel bandwidth by a factor of $\phi$.

The FEC parameters (n,k) can be chosen to meet requirements for protection, delay and bandwidth for a specified probability of packet loss. Unfortunately, it may be impossible to meet all requirements simultaneously and a compromise among the various requirements may be necessary. Furthermore, the available channel bandwidth imposes a practical limit on the ratio $\phi$. A very high ratio may impose a bandwidth requirement that either causes the starvation of packets from other data sources or exceeds the available bandwidth of the communication channel. The optimal choice of the FEC parameters should take into account the available bandwidth of the channel as well as the bandwidth required by packets provided by other data sources.

In practice, however, conditions in a communication system can change rapidly. An optimum choice of FEC parameters that provides the desired level of protection with the least increase in bandwidth requires that the FEC parameter values (n,k) be set adaptively in response to changing conditions. Techniques referred to herein as "FEC Optimization Techniques" that may be used to set these parameters adaptively are discussed in international patent application publication no. WO 2007/005160 entitled "Method and System for Optimizing Forward Error Correction of Multimedia Streaming over Wireless Networks," published Jan. 11, 2007 and filed May 26, 2006 under the Patent Cooperation Treaty, in Bauer and Jiang, "Optimal Choice of FEC Parameters to Protect Against Queuing Losses in Wireless Networks," IEEE Int. Conf. on Networks (ICON), November 2005, Kuala Lumpur, Malaysia, and in Bauer and Jiang, "Optimal Parameter Settings for Forward Error Correction Schemes for Multimedia Streaming over Wireless Networks," IEEE Multimedia Sig. Proc. Workshop (MMSP), Oct. 30-Nov. 2, 2005, Shanghai, China, pp. 349-352. In one implementation that is disclosed in these references, a receiver monitors the transmissions of a processing device, estimates the probability of packet loss for a set of packets due to buffer overflow in the processing device, and sends an indication of the estimated loss probability to the data source. The data source can adapt the FEC parameters it uses in response to the indication of loss probability.

If conditions change significantly after the loss probability for a set of packets is estimated, the indication of loss probability that is returned to the data source will not accurately reflect current conditions and the data source may not adapt its FEC parameters in an optimum manner. What is needed is a process that can estimate loss probability accurately yet respond to changes in conditions more rapidly.

DISCLOSURE OF INVENTION

It is an object of the present invention to provide for an improved way to estimate the probability of packet losses in a packet communication system due to buffer overflow in processing devices. The estimated probability can be used to adapt error-correction parameters in a packet communication system to minimize the effects of packet losses.

According to one aspect of the present invention, provisioning of packets in a communication system is controlled by determining an arrival time for a packet in a set of packets when a processing device receives the packet from a data source, determining release times when packets of data are released from a buffer in the processing device, deriving from the arrival time and the release times a measure of probability that the buffer was full at the arrival time, and providing to the data source a control signal with information representing the measure of probability so that the data source can adapt its generation of error-correction packets in sets of packets. All or a portion of this aspect of the present invention may be implemented in the processing device or in a receiver that receives an output signal transmitted by the processing device that includes packets of data of which at least some were stored in the buffer.

The various features of the present invention and its preferred embodiments may be better understood by referring to the following discussion and the accompanying drawings. The contents of the following discussion and the drawings are set forth as examples only and should not be understood to represent limitations upon the scope of the present invention.

MODES FOR CARRYING OUT THE INVENTION

A. Introduction

1. Exemplary Communication System

Figure 1:
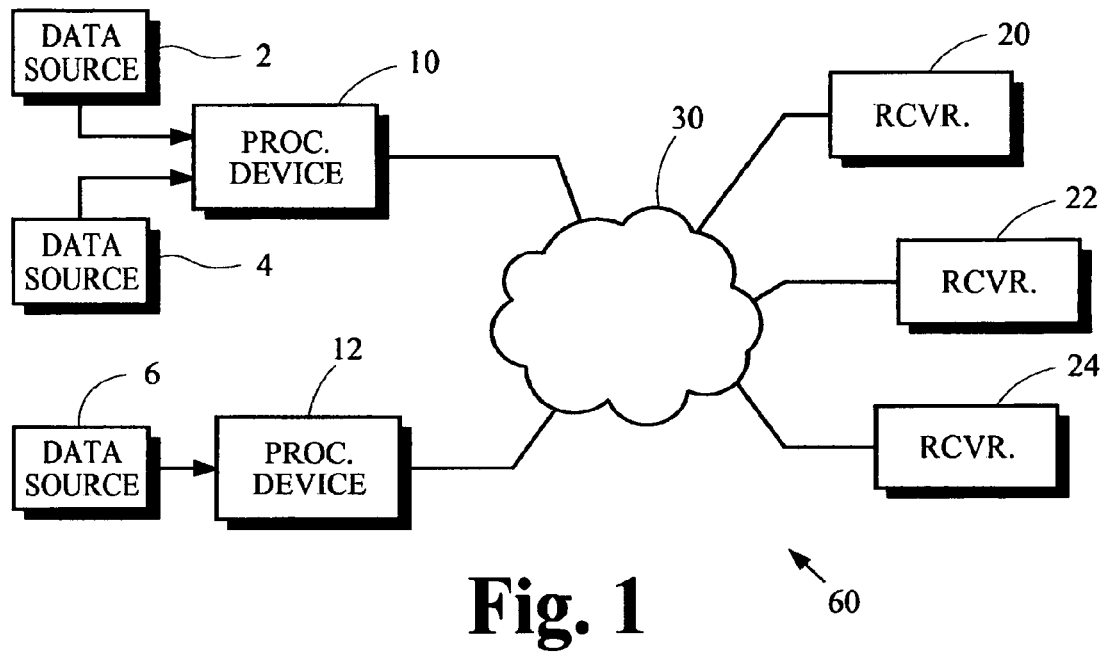
FIG. 1 is a schematic diagram of a communication system.

FIG. 1 is a schematic diagram of one example of a communication system in which various aspects of the present invention may be incorporated. The data sources 2, 4, 6 provide source signals that convey digital data arranged in sets of packets to one or more processing devices 10, 12, which in turn broadcast this digital data for reception by one or more of the receivers 20, 22, 24. The communication system may include other data sources, processing devices, receivers and transmission media in addition to what is illustrated.

The data carried in at least some of the packets may be multimedia data, for example. In one example that is discussed below, the source signal provided by the data source 2 conveys data arranged in "primary packets" that are associated with some application. Other data sources such as the data source 4 provide source signals conveying data arranged in packets referred to as "competing packets" because these latter packets compete for resources needed to service the primary packets; however, the source signals from the other data sources need not carry the same type of data and the competing packets need not be arranged in the same manner as that described for the data source 2. The sets of packets provided by the data source 2 include some error-correction data such as redundant data in packets that may be used in a forward error correction (FEC) process to recover missing or corrupted data.

The source signals from the data sources 2, 4, 6 are passed along communication paths to processing devices 10, 12. These communication paths may be implemented by a wide variety of communication technologies. For example, media such as metallic wires or optical fibers conforming to any of the IEEE 802.3 standards and a communication protocol such as the Transmission Control Protocol/Internet Protocol (TCP/IP) may be used.

The processing devices 10, 12, which may be routers or wireless access points, for example, store data representing at least some of the packets in buffers and subsequently transmit the data for those packets into the communication network 30 for reception by one or more receivers such as the receivers 20, 22, 24. If a buffer is full when a packet arrives at a processing device, the data for one or more packets will be lost or omitted from the signal transmitted by the processing device. The receivers 20, 22, 24 receive packets from the communication network 30, perform any error detection or error correction processes that may be desired, and provide the received data for processing according to the needs of some application. The communication network 30 may be implemented in a wide variety of ways including communication media such as metallic wires, optical fiber or space for electromagnetic communications with associated equipment that communicates through the media using a communication protocol such as TCP/IP. The network may conform to a standard such as Ethernet, which is described in the IEEE 802.3 standard, or WiFi, which is described in the IEEE 802.11 standard. No particular medium, protocol or communication standard is critical to practice the present invention.

In one example, the data source 2 provides to the processing device 10 a stream of packets arranged in sets that convey encoded audio data and error-correction data that is destined for the receiver 20. The processing device 10, which in this example is an access point (AP) in a wireless network, stores data representing the packets in its buffer and subsequently transmits that data into an electromagnetic communication network 30. As mentioned above, the data for one or more packets may be lost or omitted from the transmission if the buffer in the processing device 10 is full when a packet arrives. The receiver 20 receives the transmitted data, applies any error-correction or error-recovery processes that may be desired, and passes the data to some appliance such as an audio decoder and audio playback system.

The present invention is directed toward optimizing the error-correction process so that the probability of loss due to a buffer being full is either minimized or reduced to some acceptable level. Aspects of the invention may be implemented in a receiver or processing device. If aspects of the present invention are implemented in the receiver 20, which is described in the examples discussed below, the receiver 20 monitors the communications medium 30 for all transmissions that it can receive. The receiver 20 analyzes the signal that is transmitted by a particular processing device such as the processing device 10, for example, which is destined for a particular receiver such as the receiver 20 itself. If aspects of the present invention are implemented in the processing device 10, operations within the processing device are analyzed by essentially the same techniques. These techniques are discussed below in detail.

The schematic illustration shown in FIG. 1 omits a number of components that may be desirable in a practical implementation of a communication system but are not needed to explain the present invention. For example, the figure does not illustrate the components that would be needed to establish whether the communication network 30 is clear, that is, whether other processing devices are currently using the communication network 30, or whether some type of interference exists that is likely to prevent reception by an intended receiver. Also not shown are components that would be needed to obtain from a receiver any information on packet losses or the need to retransmit packets.

Throughout the remainder of this disclosure, more particular mention will be made of implementations in which the communication paths between the data sources 2, 4 and the processing device 10 conform to one of the IEEE 802.3 standards and the communication network 30 conforms to one of the IEEE 802.11 standards. The streams of data that are conveyed by these technologies are arranged according to a Medium Access Control (MAC) protocol, which arranges the data into MAC frames that include a packet of application data appended to a MAC header. The MAC header includes various control data such as the network address of the source of the application data ("source address"), the network address of the intended recipient or recipients of the application data ("destination address"), and a sequence number for the appended application data packet. These details of implementation are provided as examples. The present invention may be used with essentially any desired communication technology.

For technologies that conform to the IEEE 802.3 and IEEE 802.11 standards, it is technically accurate to say MAC frames conveying packets of data are transmitted and received; however, the following discussion is simplified somewhat by sometimes describing these types of activities as transmitting and receiving packets.

2. Exemplary Error-Correction Facility

Devices in the communication system 60 may incorporate a variety of error-correction or error-recovery techniques such as conventional forward-error-correction (FEC) processes or quality-of-service processes such as, for example, having either data sources or processing devices retransmit those packets that a receiver does not acknowledge receiving. The present invention may be used with essentially any error-correction facility that can be adapted in response to one or more parameters to reduce buffer-overflow losses. One suitable facility known as Forward Error Correction (FEC) is discussed above. This facility can be adapted in response to the two FEC parameters (n,k), where a number (n−k) of "FEC packets" are combined with a number k of multimedia packets to form a set of packets with a total number of n multimedia and FEC packets. If a receiver can receive at least k of the n packets without corruption, then any losses due to missing and corrupted packets can be corrected. Optimum values for the FEC parameters (n,k) can be derived from an estimate of packet loss probability using the FEC Optimization Techniques mentioned above.

These FEC Optimization Techniques obtain an estimate of the packet loss probability. The following discussion describes improved ways to derive an estimate of packet loss probability that is more responsive to rapid changes in conditions that affect this loss probability.

3. Overview of Techniques

Techniques taught by the present invention analyze the level of occupancy for the buffer in a processing device and use the results of this analysis to estimate the probability of packet loss due to buffer overflow. These techniques may be used with essentially any packet-based communication network that provides for the ability to broadcast signals to a plurality of receivers. Exemplary implementations of these techniques described below are based on a few assumptions that are explained in the following paragraphs.

One assumption is that the source signals conveying sets of packets propagate from the data source 2 to the processing device 10 in an amount of time that is negligible. If this assumption is not valid for a particular implementation, appropriate adjustments in the analysis can be made to account for the propagation time. A few ways that may be used to estimate the propagation time are described in international patent application no. PCT/US2007/008941 by Wenyu Jiang entitled "Estimating Wireless Processing Device Queue Length and Estimating Signal Reception Quality in a Wireless Network" filed Apr. 9, 2007.

The implementations described below assume the communication network 30 conveys MAC frames with data packets appended to MAC headers as described above and uses a communication protocol that attempts to ensure the MAC frames are delivered successfully to the intended recipient. More particular mention is made of a protocol that conforms to one of the IEEE 802.11 standards and retransmits a MAC frame until either the intended recipient acknowledges successful receipt or a specified number of retransmissions have been attempted.

According to this protocol, the processing device 10 will re-transmit a packet if its intended receiver does not receive it without errors. The receiver 20 must keep a record of all MAC frames that it receives so that it can determine which packets are transmitted by the processing device 10 and which packets are unique. This can be accomplished by using the cyclical redundancy code (CRC) in each MAC frame to detect errors and using a correction process such as forward error correction to correct as many data errors as possible, examining data in the MAC header to determine if the MAC frame was transmitted by the processing device 10, and keeping a record of other data in the frame that indicates whether the MAC frame represents a re-transmission of a packet.

Whether a MAC frame is transmitted by the processing device 10 can be determined by examining data in the MAC header known as the Direction-flag and the source address. Whether a MAC frame represents the re-transmission of a packet can be determined by examining other data in the MAC header known as the packet sequence field. If desired, a transmission-retry indicator known as the Retry_flag may also be used.

Figure 2:
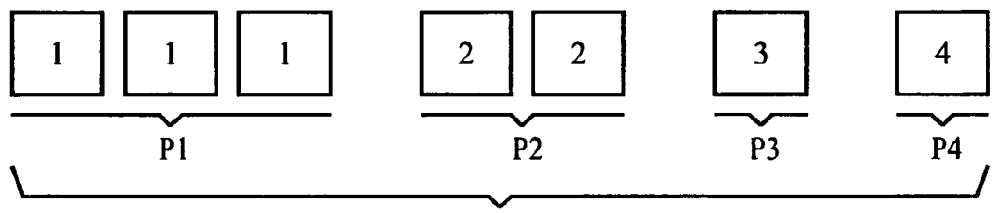
FIGS. 2 to 3 are schematic diagrams of a stream of packet frames.

Many protocols such as those that conform to the IEEE 802.11 standards use some means to identify each unique packet that is transmitted by the same device. The IEEE 802.11 standards specify a 12-bit field that conveys a monotonically increasing sequence number for each unique packet. The sequence number is incremented by one for each subsequent MAC frame that carries a unique packet. If two adjacent MAC frames transmitted by the same device have the same sequence number, the subsequent frame is deemed to represent a re-transmission of the packet. If two adjacent MAC frames have sequence numbers that differ by one, modulo $2^{12}$, where the earlier frame has the lower number, modulo $2^{12}$, then the two frames are deemed to convey unique successive packets in a stream of packets. Four unique packets P1, P2, P3, P4 with sequence numbers 1, 2, 3, 4 in a stream of frames is illustrated schematically in FIG. 2.

Figure 3:
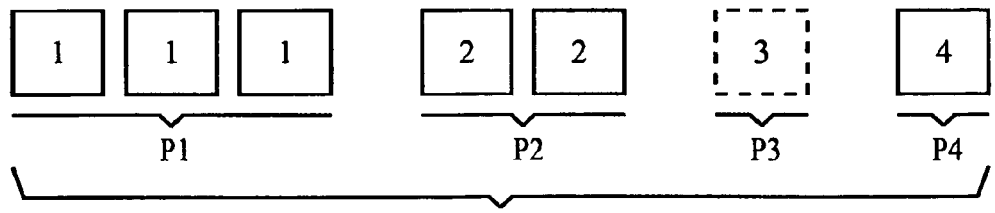

If the communication network 30 is a wireless communication path, a low signal-to-noise ratio or strong interfering signals may prevent the receiver 20 from recognizing some of the packets that are transmitted by the processing device 10. If the receiver 20 is the intended recipient, this loss can be recognized by the processing device 10 because the receiver 20 does not acknowledge successful receipt of the packet. The processing device 10 re-transmits the packet until successful receipt is acknowledged. If the receiver 20 is not the intended recipient, however, the loss may not be detected. This condition is illustrated schematically in FIG. 3, where the box with broken lines represents a frame with a packet P3 that is not observed by the receiver 20. For this reason, if aspects of the present invention are to be implemented in a receiver, it is preferable to estimate packet loss probabilities based on an analysis of packets that are destined to the receiver in which the analysis is performed if it is not possible to use a receiver that can observe all of the packets transmitted by the processing device 10.

Because the re-transmission described above can significantly increase the reliability of transmission, packet losses in a communication network that conforms to an IEEE 802.11 standard are generally caused by buffer overflow in a processing device. Losses are rarely caused directly by bit errors that occur during transmission over the air interface; however, an increase in bit errors is often caused by degraded channel conditions that can lead to buffer-overflow losses.

When the re-transmission process described above is used in a communication network, the last transmission of a particular packet usually represents a successful delivery of that packet to its intended recipient. When the processing device confirms a packet has been successfully delivered, it does not need to store the data for that packet in its buffer. The space in the buffer that was used to store the packet can be released for other use such as storing the data for another packet. For this reason, the last transmission of a particular packet is assumed to correspond to the "release time" when the processing device releases the previously used space in its buffer for other use.

It is assumed the processing device 10 stores data in its buffer and releases space in its buffer using a First In First Out (FIFO) queuing scheme. The analytical expressions described below assume the buffer capacity or the amount of data that can be stored by the buffer in the processing device 10 is specified in terms of the number of packets that can be represented simultaneously by the stored data. If the buffer can at one instant store data representing ten packets, the buffer capacity or the maximum level of buffer occupancy is said to be ten. Other ways of specifying buffer capacity such as bytes may be used by modifying the analytical expressions appropriately.

A model for the buffer queuing scheme represents three events.

(1) A "store event" occurs when a packet from a data source arrives at the processing device 10 and space in the buffer is allocated to store the data for that packet. This event increases the queue length by one.

(2) A "release event" occurs when the processing device successfully delivers a packet to its intended recipient or a maximum number of re-transmissions have been attempted and the buffer space storing the data for that packet data is released for other use. This event is sometimes referred to below as releasing a packet from the buffer; it decreases the queue length by one.

(3) A "discard event" occurs when a packet from a data source arrives at the processing device 10 and the buffer has no available space to store the data for that packet. The buffer is full and the queue length equal to the maximum level of buffer occupancy. This event does not change the queue length.

According to this model, the probability of packet loss due to buffer overflow is equal to the probability of a discard event, which can be derived from an analysis of buffer occupancy.

Buffer overflow will occur if the average rate of arrival for all packets arriving at the processing device is higher than the average rate the processing device can successfully deliver packets to intended recipients for a sufficiently long period of time. Under this condition, the queue length L increases up to the maximum level T of buffer occupancy or maximum queue length, which is denoted as L=T. A transient analysis of the process leading to buffer overflow can be performed by examining the steady states for a set of queue lengths T, T−1, T−2, ... T−$n_C$, where $n_C$ is the number of initial states considered in the transient analysis. It is usually sufficient to consider only a limited number of initial states. In one implementation, for example, $n_C$=10.

Transient analysis may be performed in two steps. The first step determines a probability distribution of the queue length. The second step analyzes the loss probability for an arriving packet based on the queue-length probability distribution. The loss probability of a packet is equal to the probability that the buffer is full when that packet arrives at the processing device.

As may be inferred from the buffer-queuing model described above, the level of buffer occupancy or queue length depends on when packets are released from the buffer and when primary and competing packets arrive at the processing device. A perfectly accurate measure of loss probability requires a knowledge of arrival times of primary and competing packets and release times of all packets. All of this information is available by direct observation to processes performed in a processing device. If the transient analysis is performed in a receiver, the process that performs the analysis generally can infer accurate release times from direct observations of transmissions by the processing device but it cannot determine the exact arrival times of the primary and competing packets; however, as explained below, the receiver can derive estimates of these times from observations of transmissions by the processing device and use these estimates with probabilities calculated using the FEC Optimization Techniques mentioned above.

B. Transient Analysis to Estimate Loss Probability

1. Arrival Times

In the exemplary implementation described here, all n packets in a set of packets are generated by the data source 2 in a series of evenly-spaced time slots, one packet per time slot, and sent to the processing device 10 within a specified interval of time denoted by the symbol τ. The first k packets in each set of packets are "multimedia packets" carrying segments of data in a stream of multimedia data. The remaining (n−k) packets in the set of packets are "FEC packets" carrying redundant data that may be used to recover missing or corrupted multimedia data. The interval of time that is spanned by the time slots for the set of n packets is n·τ=n·21.33 msec. in one exemplary system. If FEC is not used, then no FEC packets are present in the set and n=k.

If the FEC parameters (n,k) are never adapted, the data source 2 sends the i-th packet in a particular multimedia stream at a sending time $t_S$ that can be calculated as $$t_S = t_{INITIAL} + (i-1) \cdot \tau \quad (1)$$

where $t_{INITIAL}$=sending time of initial packet in the multimedia stream.

If the FEC parameters are adapted, however, the expression needed to determine the sending time for the i-th packet is more complex because the number of packets in each set of packets varies and the spacing between time slots is no longer constant. The only thing that does not vary is the sending time for the first packet in each set of packets. If the i-th multimedia packet in the stream is constrained to be the first packet in some set of packets, then the sending time for that packet can be calculated from expression 1. The sending time for all subsequent packets in that set must account for a spacing between adjacent packets that can vary because the number of packets n in each set can vary. A more general expression for the sending time is shown in equation 2

$$t_S = t_{INITIAL} + (i-1) \cdot \tau + \frac{k}{n}(j-1) \cdot \tau \quad (2)$$

where i∈{first packets in sets of packets}; and
j=number of a packet within a respective set, $1 \leq j \leq n$.

If desired, the time $t_{INITIAL}$ can be set equal to the sending time of the first packet in any set of packets. The receiver 20 can obtain this time from information that is carried in the application-layer header for that packet. The receiver 20 can also derive the FEC parameters for each set of packets by determining which packets are multimedia packets and which are FEC packets from information carried in the application-layer headers.

The process used by the data source 2 may not be able to send each packet at precisely the correct time because of processing delays or other situations that cannot be predicted or controlled; therefore, it is preferable to acknowledge the sending time may vary and the expressions in equations 1 and 2 determine a nominal sending time rather than an exact sending time. The actual sending time can be modeled as a uniformly distributed random variable within the range ($t_S$−b, $t_S$+b). For the example discussed here, b is set equal to 1 msec.

By monitoring transmissions of the processing device 10, the receiver 20 can derive packet release times and then calculate levels of buffer occupancy at different arrival times within the range ($t_S$−b, $t_S$+b). An estimate of packet loss probability can be calculated from buffer occupancy levels obtained by integrating the calculated levels across the range of arrival times.

2. Probability of Full Buffer at Arrival Times

The release times of a packet may be obtained from information carried in the MAC header for the packet that indicates when it was transmitted. The release time for a packet is obtained from the time the packet was transmitted successfully to the intended recipient as discussed above.

Figure 4:
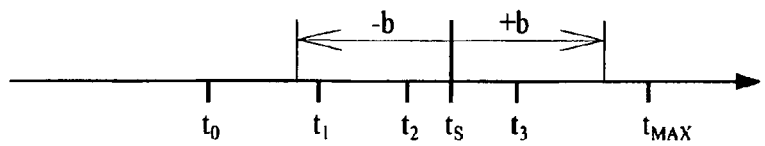
FIGS. 4 to 5 are schematic diagrams of a series of packet release times and a range of packet arrival times.

Referring to FIG. 4, the times $t_0$, $t_1$, $t_2$, ... represent the times of successful transmission for packets P0, P1, P2, ..., respectively. These times are assumed to represent the release times from the buffer because it is assumed the amount of time between transmission and release from the buffer is negligible. If this assumption is not correct, the following technique can be adjusted to allow for an appropriate amount of time. The time $t_S$ represents the nominal sending time for a packet, which is assumed to be its arrival time. The time $t_1$ represents the first release time within the range ($t_S$−b, $t_S$+b), and the time $t_{MAX}$ represents the first release time that occurs after that range.

According to the modeling assumptions described above, a packet can arrive at the processing device 10 any time between $t_S$−b and $t_S$+b. Let $t_A$ denote the actual arrival time. The probability that the buffer in the processing device 10 is full at time $t_A$ can be calculated by obtaining the probability of all situations in which the level of buffer occupancy L is equal to T when a packet arrives. For example, if $t_A$ occurs between release times $t_1$ and $t_2$, then the buffer is full if either of the following conditions are true:

(1) L=T immediately before release time $t_1$, which means L=T−1 immediately after release time $t_1$, and at least one competing packet arrives between release time $t_1$ and actual arrival time $t_A$; or (2) L=q<T immediately before release time $t_1$, which means L=q−1 immediately after release time $t_1$, and at least T−(q−1) competing packets arrive between release time $t_1$ and actual arrival time $t_A$.

Similarly, if arrival time $t_A$ is between release times $t_2$ and $t_3$, then the buffer is full if either of the following conditions are true:

(1) L=T immediately before release time $t_2$, which means L=T−1 immediately after release time $t_2$, and at least one competing packet arrives between release time $t_2$ and actual arrival time $t_A$; or (2) L=q<T immediately before release time $t_2$, which means L=q−1 immediately after release time $t_2$, and at least T−(q−1) competing packets arrive between release time $t_2$ and actual arrival time $t_A$.

3. Recursive Function that Models Buffer Occupancy

The probabilities discussed above can be derived from a recursive function p(m,B) that represents the probability that buffer occupancy is equal to some level B immediately after some release time $t_m$ for m=1, 2, .... When m=0, the recursive function p(m,B) is initialized by calculating the steady state probability for a level of buffer occupancy equal to B given three values. The first value is the rate $p_C$ at which a competing packet arrives at the packet processing device 10. This is an accumulative arrival rate for all competing packets from all sources. The second value is the rate $p_D$ at which the processing device 10 successfully retrieves a packet from its buffer and either transmits it successfully to the intended recipient or reaches the limit of re-transmissions. In either case, the packet is released from the buffer. The third value is the maximum capacity of the buffer, denoted as T. It is assumed that only the buffer states T−$n_C$≦B≦T need to be considered The probabilities $p_C$ and $p_D$ may be calculated using the FEC Optimization Technique mentioned above.

An adjustment to the calculated probabilities is needed to account for the fact the FEC Optimization Technique calculates steady state probabilities regardless whether a packet has just been released from the buffer. In contrast to this situation, the initialization of the recursive function p(0,B) occurs only at times $t_0$ when a packet has just been released from the buffer. This difference manifests itself in the probability p(0,T), which represents the probability that the level of buffer occupancy is equal to T immediately after $t_0$.

According to the FEC Optimization Technique, the steady-state probability p(0,T) is non-zero whenever $p_C$>$p_D$. According to the model used here, however, where to is known to be a release time, the probability p(0,T) is always zero because the buffer can never be full. It is known that the level of buffer occupancy can never be larger than T immediately before the release time $t_0$; therefore, the level of buffer occupancy can never be larger than T−1 immediately after the release time $t_0$ because one packet has just been released from the buffer but no packet arrived and was stored in the buffer during the infinitely small interval between the point immediately before the release time $t_0$ and the point immediately after the release time $t_0$. The inaccuracy that would result from this difference can be compensated by discarding the steady-state probability for a full buffer and normalizing the probabilities for the remaining $n_C$ buffer states so that their summation is equal to one.

For m>0, p(m,B) is defined recursively. The recursion formulas differ for the two conditions mentioned above, namely condition (1) where B=T−1 and condition (2) where B<T−1. For condition (2), the recursion may be expressed as:

$$p(m, T-l-1) = \sum_{j=0}^{m+l+n_C-1} p(m-1, T-l-j) \cdot P[j, t_m - t_{m-1}] \quad (3)$$

where $P[j, dt]$ is the Poisson function $$e^{-\lambda \cdot dt} \frac{(\lambda \cdot dt)^j}{j!},$$

which is the probability of having exactly j arrivals of competing packets in an interval of length dt in a Poisson process with a Poisson parameter $\lambda = p_C$. The technique discussed here assumes the distribution of all competing traffic may be represented with reasonable accuracy by a Poisson distribution.

The correctness of equation 3 can be seen by examining the meaning of its individual components. If just after release time $t_{m-1}$ the level of buffer occupancy is T−1−j, which has the probability p(m−1, T−1−j), and if exactly j competing packets arrive at the processing device between times $t_{m-1}$ and $t_m$, which has probability $P[j, t_m - t_{m-1}]$, then the level of buffer occupancy would be T−1 immediately before the release time $t_m$. Immediately after time $t_m$, one packet is released from the buffer and the level of buffer occupancy becomes T−1−1. This accounts for one particular value of j buffer occupancy being T−1−1 immediately after time $t_m$. The value for p(m, T−1−1) is obtained by adding the individual probabilities for all legal values of j. In equation 3, j is restricted to be no larger than $m+l+n_C-1$ such that $B = T-1-j \geq T-n_C-(m-1)$ because only $n_C$ buffer states are considered, where it is assumed that $B \geq T-n_C$, and because immediately after time $t_{m-1}$ or m−1 packet releases since time $t_0$, the level of buffer occupancy will decrease by at most m−1; therefore $B \geq T-n_C-(m-1)$. As a result, there is no need to include terms for p(m,B) wherein $B<T-n_C-(m-1)$, and thus no need for $j>m+l+n_C-1$.

In equation 3, the variable m is restricted to the range from 1 to MAX−1. The value of m is restrained to be less than MAX because m represents the probability the level of buffer occupancy is T−1−1 immediately after time $t_m$. Because the next packet does not arrive before release time $t_{MAX}$, there is no need to calculate p(MAX T−1−1).

The variable l is restricted to the range from 1 to $m+n_C-1$ because the level of buffer occupancy immediately after release time $t_m$ cannot be lower than one below the level that existed immediately after the release time $t_{m-1}$. Because the level of buffer occupancy immediately after time to is between $T-n_C$ and T−1, the minimum level immediately after time $t_m$, which is after m packet releases, is $T-n_C-m$. The maximum level of buffer occupancy after any time $t_m$, is T−1. As a result, the level of buffer occupancy is known to be between $T-m-n_C$ and T−1 immediately after the release time $t_m$. This corresponds to a range for the variable l from zero to $m+n_C-1$. The special case for l=0 is handled separately as shown below in equation 4.

For the special case where l=0, p(m,B) is calculated from:

$$p(m, T-1) = \sum_{j=0}^{m+l+n_C-1} p(m-1, T-j) \cdot P[\geq j, t_{m+1} - t_m] \quad (4)$$

where $P[\geq j, dt] = \sum_{i=0}^{j} P[i, dt]$.

The correctness of equation 4 can be seen by examining the meaning of its individual components in a manner similar to that discussed above for equation 3. If the level of buffer occupancy is T−j immediately after release time $t_{m-1}$ and at least j competing packets arrived between time $t_{m-1}$ and time $t_m$, then the buffer will be full immediately before time $t_m$ and the level of buffer occupancy will be exactly T−1 immediately after time $t_m$.

4. Estimating Packet Loss Probability

Using the information discussed above, a process that is performed in the receiver 20 may calculate the average probability $P_{LOSS}$ of packet loss in the processing device 10 for a given set of packets generated by the data source 2 that is caused by buffer overflow. This process is based on a recognition that, for each m where $t_{m-1} < t_A < t_m$ and where $t_A$ is the actual sending time of a packet, if the level of buffer occupancy is equal to T−1−1 immediately after the release time $t_{m-1}$, then no packet is lost due to buffer overflow if no more than l competing packets arrive during the interval from $t_{m-1}$ to $t_A$. The probability that no packet loss occurs for the actual sending time $t_A$ is equal to the product of the probabilities for these two conditions. The probability that the level of buffer occupancy is equal to T−1−1 immediately after the release time $t_{m-1}$ may be obtained from the expression p(m−1, T−1−1) and the probability that no more than l packets arrive during the interval from $t_{m-1}$ to $t_A$ may be obtained from the expression $P[\leq l, t_A - t_{m-1}]$ as explained above. Because a process performed in the receiver 20 generally cannot determine the actual sending time $t_A$, the probability of no packet loss for a specified range of possible sending times is obtained by integrating this product over this range of sending times and weighting this integration by the uniform probability distribution of the sending times as described above, which may be expressed as:

$$\frac{1}{2b} \int_{max(t_{m-1}, t_S-b)}^{min(t_m, t_S+b)} p(m-1, T-l-1) \cdot P[\leq l, t_A - t_{m-1}] dt_A \quad (5)$$

The integration can be simplified by recognizing that the probability-function p(m−1, T−l−1) is constant and can be moved outside the integral as follows:

$$\frac{1}{2b} \int_{max(t_{m-1}, t_S-b)}^{min(t_m, t_S+b)} p(m-1, T-l-1) \cdot P[\leq l, t_A - t_{m-1}] dt_A = \quad (6)$$

$$\frac{1}{2b} \cdot p(m-1, T-l-1) \int_{max(t_{m-1}, t_S-b)}^{min(t_m, t_S+b)} P[\leq l, t_A - t_{m-1}] dt_A$$

The probability of no loss may be obtained by summing this result for all considered levels of buffer occupancy l from zero to $m+n_C-1$ and for all considered packet release events m from one to MAX. The desired probability of packet loss $P_{LOSS}$ can be obtained by subtracting the probability of no loss from one, which may be expressed as:

$$P_{LOSS} = 1 - \frac{1}{2b} \sum_{m=1}^{MAX} \sum_{l=0}^{m+n_C-1} p(m-1, T-l-1) \cdot \int_{max(t_{m-1}, t_S-b)}^{min(t_m, t_S+b)} P[\leq l, t_A - t_{m-1}] dt_A \quad (7)$$

The term within the integral is a summation of Poisson distributions as shown above. The integration may be rewritten as a summation of integrals as follows:

$$\int_{max(t_{m-1}, t_S-b)}^{min(t_m, t_S+b)} P[\leq l, t_A - t_{m-1}] dt_A = \int_{max(t_{m-1}, t_S-b)}^{min(t_m, t_S+b)} \sum_{i=0}^{l} P[i, t_A - t_{m-1}] dt_A \quad (8)$$

$$= \sum_{k=0}^{l} \int_{max(t_{m-1}, t_S-b)}^{min(t_m, t_S+b)} P[k, t_A - t_{m-1}] dt_A$$

The integration itself may be calculated by a summation. This may be seen by first recognizing that the indefinite integral of a Poisson distribution is equal to a summation as follows:

$$\int P[k, t_A - t_{m-1}] dt_A = -\frac{1}{\lambda} \sum_{j=0}^{k} P[j, t_A - t_{m-1}] \quad (9a)$$

The definite integral may be calculated using the Newton-Leibniz formula, which states:

$$\int_a^b f(x) dx = F(x) \big|_a^b = F(b) - F(a) \quad \text{where} \quad \int f(x) dx = F(x).$$

Using the Newton-Leibniz formula, the definite integral may be calculated from the following expression:

$$\int_{max(t_{m-1}, t_S-b)}^{min(t_m, t_S+b)} P[k, t_A - t_{m-1}] dt_A = G(k, t_A) \big|_{max(t_{m-1}, t_S-b)}^{min(t_m, t_S+b)} \quad (9b)$$

$$\text{where } G(k, t_A) = -\frac{1}{\lambda} \sum_{j=0}^{k} P[j, t_A - t_{m-1}]$$

With this result, the loss probability can be calculated from a series of summations as follows:

$$P_{LOSS} = \quad (10)$$

$$1 - \frac{1}{2b} \sum_{m=1}^{MAX} \sum_{l=0}^{m+n_C-1} p(m-1, T-l-1) \cdot \sum_{k=0}^{l} \left( G(k, t_A) \big|_{max(t_{m-1}, t_S-b)}^{min(t_m, t_S+b)} \right)$$

5. Extension for Initialization

The techniques discussed above will predict a higher loss probability when communication channel conditions suddenly degrade. The degradation is reflected by a decrease in the probability $p_D$. The decrease in the value for $p_D$ is equivalent to an increase in the time interval between release events for adjacent packets in a stream of packets. This interval is referred to as the "inter-packet time." These techniques are very responsive to sudden changes in inter-packet times provided the changes occur within the interval from time $t_s-b$ to time $t_s+b$. The techniques are not very responsive to changes in the inter-packet times that occur immediately before the time $t_s-b$. This deficiency can be overcome by extending the analysis process to consider earlier release times as described in the following paragraphs.

Figure 5:
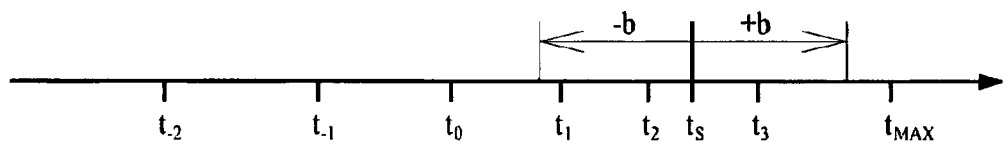

The illustration shown in FIG. 5 is similar to the illustration shown in FIG. 4 but differs in that it shows the release times for two packets P-2, P-1 prior to release time $t_0$. The release times for these two packets are denoted as times $t_{-2}$ and $t_{-1}$, respectively. In the example shown, the inter-packet times between packets P-2 and P-1 are much larger than the inter-packet times for the subsequent packets. The larger inter-packet times increase the likelihood of buffer overflow. This effect can be taken into account by initializing the recursive function for an earlier release time such as for time $t_{-2}$, which can be expressed as p(-2,B). This initialization can be done in the same way as discussed above for initialization at time $t_0$. The initialization process proceeds by substituting time $t_{-2}$ for time $t_0$ and uses the same values for $p_C$, $p_D$ and T to initialize the function p(-2,B), where $T-n_C \leq B \leq T$. The same values can be used for $p_C$ and $p_D$ because both of these values are based on averages that change much more slowly than the inter-packet times.

After initializing the function for p(-2,B), the value for p(-1,B) can be calculated recursively from p(-2,B) and the value for p(0,B) can be calculated recursively from p(-1,B) by substituting times $t_{-2}$, $t_{-1}$ and $t_0$ for times $t_0$, $t_1$, and $t_2$, respectively. Other values p(m,B) for m>0 and the loss probability $P_{LOSS}$ are calculated by the same techniques discussed above. This extension improves responsiveness to changes in inter-packet times that occur immediately prior to the analysis interval. The number of prior release events that are included in initialization can be fixed or adapted. Empirical studies suggest a fixed value between two and five generally gives good results. If desired, the number can be adapted in response to observed conditions such as a significant change in inter-packet times before and after time $t_0$ or a significant difference between inter-packet times prior to time $t_0$ and the average time represented by $p_D$.

6. Adapting FEC Parameters

By performing calculations according to equation 7 or the corresponding expression in equation 10, for example, the receiver 20 can calculate the estimated loss probability $P_{LOSS}$ for each packet in a stream of packets. An estimate of the number N of packets that will be lost in a set of n packets can be determined by summing the loss probability for each individual packet in the set of packets as follows:

$$N = \sum_{i=1}^{n} P_{loss}(i) \quad (11)$$

where $P_{LOSS}(i)$=loss probability for packet i in a set of n packets.

The number N obtained from equation 11 indicates the average of number of FEC packets that are needed in each set under current conditions to recover data conveyed in lost packets. Unless FEC parameters are varied, the current set of packets being generated by the data source 2 will contain a number of FEC packets equal to (n−k). If N is significantly different from (n−k), then the FEC parameters are not set optimally. If the data source 2 can be informed of this fact before the current set has been generated, the FEC parameters can be adapted to account for changes in conditions. For example, the data source 2 may be able to adapt the value of n and maintain the value of k without having to regenerate or resend any FEC packets. This can be done in any way that may be desired such as the "code combining" technique discussed in McAuley, "Reliable Broadband Communication Using a Burst Erasure Correcting Code," Proc. of ACM SIG-COMM'90, Philadelphia, September 1990, pp. 297-306.

If N<(n−k), there may be too many FEC packets in the set. The data source 2 may be able to truncate the generation of FEC packets and reduce the number of packets that are sent to the processing device 10.

If N>(n−k), there may be an insufficient number of FEC packets in the set to allow recovery of the data being conveyed in all lost packets. The number of additional FEC packets that may be needed can be determined from the average probability $P_{AVE}$ that a packet in a set of packets will be lost, which is:

$$P_{AVE} = \frac{N}{n}. \quad (12)$$

The average probability that a packet in the set will not be lost is $1-P_{AVE}$. Given the need for an average of N−(n−k) additional FEC packets, the data source 2 may need to generate a number of FEC packets equal to:

$$\frac{N-(n-k)}{1-P_{AVE}} \quad (13)$$

so that a sufficient number of the additional FEC packets survive. It is assumed that the introduction of the additional FEC packets has a negligible affect on the loss probability. It is also assumed that the data source 2 is provided with this information soon enough so that it can adjust the time intervals between adjacent packets to account for the larger number of packets in the set.

If desired, a ceiling may be imposed on the number of additional FEC packets or on the total number of FEC packets. In one implementation, the total number of packets n is limited to be less than or equal to four times the number of multimedia packets, which is equivalent to restricting the total number (n−k) of FEC packets to be less than three times the number k of multimedia packets.

It may be helpful to point out that the transient analysis process described above is performed in the receiver 20 and that the analysis is completed as the last packet in a set arrives at the processing device 10. This point in time may be significantly ahead of the time at which the last packet in the set is actually received or should have been received by the receiver 20. This allows the results of transient analysis to be provided to the data source 2 more quickly, thereby allowing the communication system 60 to react more quickly to rapid changes in communication conditions.

C. Implementation

Figure 6:
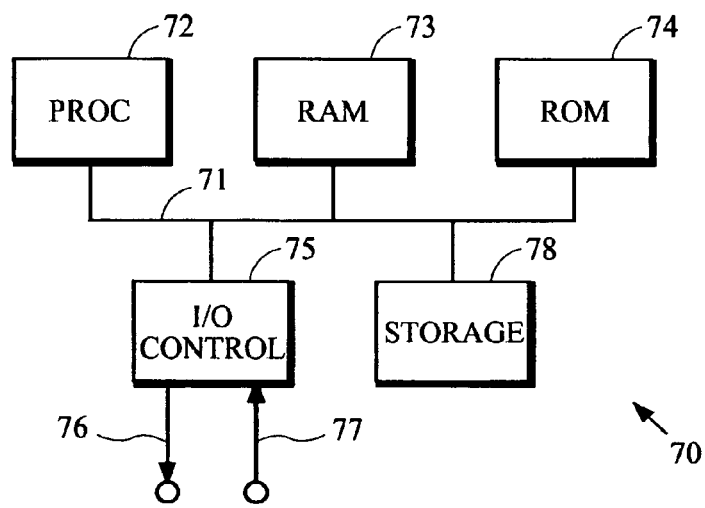
FIG. 6 is a schematic block diagram of a device that may be used to implement various aspects of the present invention.

Devices that incorporate various aspects of the present invention may be implemented in a variety of ways including software for execution by a computer or some other device that includes more specialized components such as digital signal processor (DSP) circuitry coupled to components similar to those found in a general-purpose computer. FIG. 6 is a schematic block diagram of a device 70 that may be used to implement aspects of the present invention. The processor 72 provides computing resources. RAM 73 is system random access memory (RAM) used by the processor 72 for processing. ROM 74 represents some form of persistent storage such as read only memory (ROM) for storing programs needed to operate the device 70 and possibly for carrying out various aspects of the present invention. I/O control 75 represents interface circuitry to receive and transmit signals by way of the communication channels 76, 77. In the embodiment shown, all major system components connect to the bus 71, which may represent more than one physical or logical bus; however, a bus architecture is not required to implement the present invention.

In embodiments implemented by a general purpose computer system, additional components may be included for interfacing to devices such as a keyboard or mouse and a display, and for controlling a storage device 78 having a storage medium such as magnetic tape or disk, or an optical medium. The storage medium may be used to record programs of instructions for operating systems, utilities and applications, and may include programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey data using essentially any recording technology including magnetic tape, cards or disk, optical cards or disc, and detectable markings on media including paper.

The invention claimed is:

1. A method for controlling a provision of packets in a communications network that comprises:

a data source that provides a source signal conveying data arranged in a set of packets comprising a first number of application-data packets and a second number of error-correction packets, and adapts the first number or the second number in response to control information, wherein the first number is an integer greater than zero and the second number is an integer greater than or equal to zero, a packet processing device that receives the source signal, stores data for at least some of the packets in the set of packets in a buffer, and transmits an output signal comprising packets of data of which at least some data were stored in the buffer, wherein data are stored in the buffer using a buffer queuing scheme that comprises allocating and releasing space in the buffer to store packet data, and discarding data for packets that arrive at the processing device when the buffer has no available space to store packet data; and a receiver that receives at least some of the packets in the output signal, wherein the method comprises:

obtaining an arrival time for a packet in the set of packets when the packet processing device receives the packet from the data source;

obtaining release times when space in the buffer that stores packet data is released after the packet processing device successfully transmits that packet data in the output signal to its intended recipient or a maximum number of re-transmissions have been attempted;

deriving from the arrival time and the release times a measure of probability that the buffer has no available space to store packet data at the arrival time; and generating the control information from the measure of probability.

2. The method according to claim 1 that is performed in the receiver, wherein:

the arrival time is an estimated arrival time obtained from a model of a process used by the data source to generate the source signal;

the release times are obtained by monitoring the output signal; and the measure of probability is derived from an average of a plurality of loss probabilities, each respective loss probability determined in response to the release times and a respective arrival time in a plurality of arrival times distributed about the estimated arrival time.

3. The method according to claim 2 wherein:

the processing device transmits a respective packet of data at one or more transmission times until the packet processing device receives an acknowledgment from the receiver that the respective packet of data was received, and the method obtains the release time of the respective packet of data from a last transmission time of the respective packet.

4. The method of claim 3 that comprises:

examining control information conveyed in the output signal to identify packets that are transmitted more than once; and using the control information to determine the last transmission time of the respective packet of data.

5. The method according to claim 3 that determines the respective loss probability by:

determining a probability distribution of queue length for the buffer; and using the probability distribution of queue length to estimate a probability that the buffer has no available space to store packet data at the respective arrival time.

6. The method of claim 5 that estimates the probability that the buffer has no available space to store packet data at the respective arrival time by using a recursive function to calculate a probability that the buffer has a level of occupancy equal to a specified level immediately after a specified release time.

7. The method according to claim 2 that determines the respective loss probability by:

determining a probability distribution of queue length for the buffer; and using the probability distribution of queue length to estimate a probability that the buffer has no available space to store packet data at the respective arrival time.

8. The method of claim 7 that estimates the probability that the buffer has no available space to store packet data at the respective arrival time by using a recursive function to calculate a probability that the buffer has a level of occupancy equal to a specified level immediately after a specified release time.

9. An apparatus for controlling a provision of packets in a communications network that comprises:

a data source that provides a source signal conveying data arranged in a set of packets comprising a first number of application-data packets and a second number of error-correction packets, and adapts the first number or the second number in response to control information, wherein the first number is an integer greater than zero and the second number is an integer greater than or equal to zero, a packet processing device that receives the source signal, stores data for at least some of the packets in the set of packets in a buffer, and transmits an output signal comprising packets of data of which at least some data were stored in the buffer, wherein data are stored in the buffer using a buffer queuing scheme that comprises allocating and releasing space in the buffer to store packet data, and discarding data for packets that arrive at the processing device when the buffer has no available space to store packet data; and a receiver that receives at least some of the packets in the output signal, wherein the apparatus comprises:

means for obtaining an arrival time for a packet in the set of packets when the packet processing device receives the packet from the data source;

means for obtaining release times when space in the buffer that stores packet data is released after the packet processing device successfully transmits that packet data in the output signal to its intended recipient or a maximum number of re-transmissions have been attempted;

means for deriving from the arrival time and the release times a measure of probability that the buffer has no available space to store packet data at the arrival time; and means for generating the control information from the measure of probability.

10. The apparatus of claim 9 that is the receiver, wherein:

the arrival time is an estimated arrival time obtained from a model of a process used by the data source to generate the source signal;

the release times are obtained by monitoring the output signal; and the measure of probability is derived from an average of a plurality of loss probabilities, each respective loss probability determined in response to the release times and a respective arrival time in a plurality of arrival times distributed about the estimated arrival time.

11. The apparatus of claim 10 wherein:

the processing device transmits a respective packet of data at one or more transmission times until the packet processing device receives an acknowledgment from the receiver that the respective packet of data was received, and the apparatus obtains the release time of the respective packet of data from a last transmission time of the respective packet.

12. The apparatus of claim 11 that comprises:

means for examining control information conveyed in the output signal to identify packets that are transmitted more than once; and means for using the control information to determine the last transmission time of the respective packet of data.

13. The apparatus of claim 11 that determines the respective loss probability by:
  determining a probability distribution of queue length for the buffer; and
  using the probability distribution of queue length to estimate a probability that the buffer has no available space to store packet data at the respective arrival time.

14. The apparatus of claim 13 that estimates the probability that the buffer has no available space to store packet data at the respective arrival time by using a recursive function to calculate a probability that the buffer has a level of occupancy equal to a specified level immediately after a specified release time.

15. The apparatus of claim 10 that determines the respective loss probability by:
  determining a probability distribution of queue length for the buffer; and
  using the probability distribution of queue length to estimate a probability that the buffer has no available space to store packet data at the respective arrival time.

16. The apparatus of claim 15 that estimates the probability that the buffer has no available space to store packet data at the respective arrival time by using a recursive function to calculate a probability that the buffer has a level of occupancy equal to a specified level immediately after a specified release time.

17. A non-transitory storage medium recording a program of instructions that is executable by a device to perform a method for controlling a provision of packets in a communications network, wherein the method comprises:
  a data source that provides a source signal conveying data arranged in a set of packets comprising a first number of application-data packets and a second number of error-correction packets, and adapts the first number or the second number in response to control information, wherein the first number is an integer greater than zero and the second number is an integer greater than or equal to zero,
  a packet processing device that receives the source signal, stores data for at least some of the packets in the set of packets in a buffer, and transmits an output signal comprising packets of data of which at least some data were stored in the buffer, wherein data are stored in the buffer using a buffer queuing scheme that comprises allocating and releasing space in the buffer to store packet data, and discarding data for packets that arrive at the processing device when the buffer has no available space to store packet data; and
  a receiver that receives at least some of the packets in the output signal,
wherein the method comprises:
  obtaining an arrival time for a packet in the set of packets when the packet processing device receives the packet from the data source;
  obtaining release times when space in the buffer that stores packet data is released after the packet processing device successfully transmits that packet data in the output signal to its intended recipient or a maximum number of re-transmissions have been attempted;
  deriving from the arrival time and the release times a measure of probability that the buffer has no available space to store packet data at the arrival time; and
  generating the control information from the measure of probability.

18. The storage medium of claim 17, wherein the method is performed in the receiver and wherein:
  the arrival time is an estimated arrival time obtained from a model of a process used by the data source to generate the source signal;
  the release times are obtained by monitoring the output signal; and
  the measure of probability is derived from an average of a plurality of loss probabilities, each respective loss probability determined in response to the release times and a respective arrival time in a plurality of arrival times distributed about the estimated arrival time.

19. The storage medium of claim 18 wherein:
  the processing device transmits a respective packet of data at one or more transmission times until the packet processing device receives an acknowledgment from the receiver that the respective packet of data was received, and
  the method obtains the release time of the respective packet of data from a last transmission time of the respective packet.

20. The storage medium of claim 19, wherein the method comprises:
  examining control information conveyed in the output signal to identify packets that are transmitted more than once; and
  using the control information to determine the last transmission time of the respective packet of data.

21. The storage medium of claim 19, wherein the method determines the respective loss probability by:
  determining a probability distribution of queue length for the buffer; and
  using the probability distribution of queue length to estimate a probability that the buffer has no available space to store packet data at the respective arrival time.

22. The storage medium of claim 21, wherein the method estimates the probability that the buffer has no available space to store packet data at the respective arrival time by using a recursive function to calculate a probability that the buffer has a level of occupancy equal to a specified level immediately after a specified release time.

23. The storage medium of claim 18, wherein the method determines the respective loss probability by:
  determining a probability distribution of queue length for the buffer; and
  using the probability distribution of queue length to estimate a probability that the buffer has no available space to store packet data at the respective arrival time.

24. The storage medium of claim 23, wherein the method estimates the probability that the buffer has no available space to store packet data at the respective arrival time by using a recursive function to calculate a probability that the buffer has a level of occupancy equal to a specified level immediately after a specified release time.

* * * * *